Figure 7:
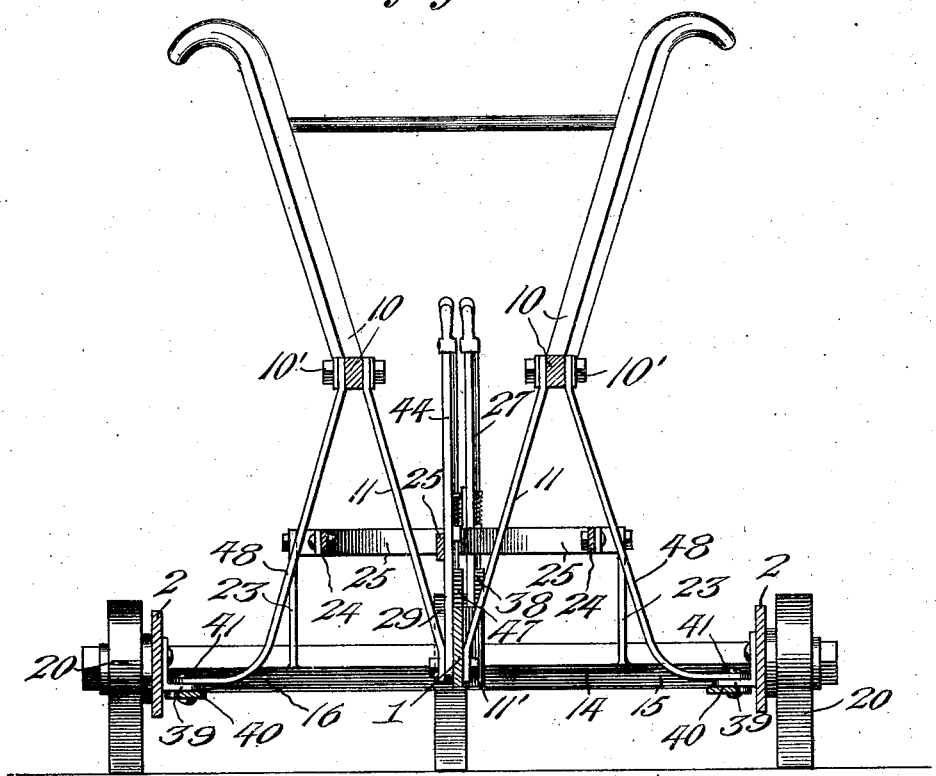

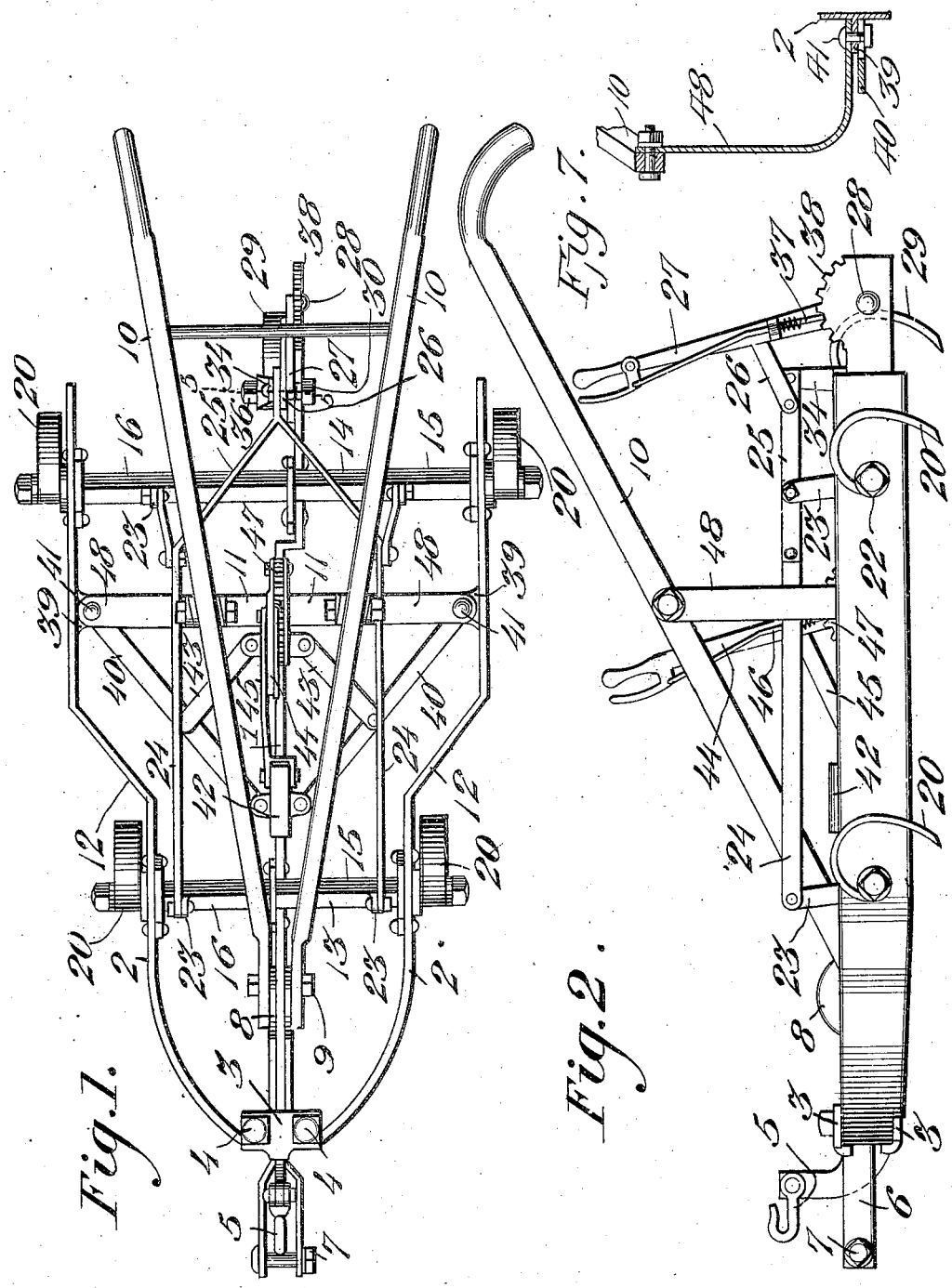

No. 847,101. PATENTED MAR. 12, 1907.
A. NOLF.
CULTIVATOR.
APPLICATION FILED JUNE 16, 1906.
3 SHEETS—SHEET 2.
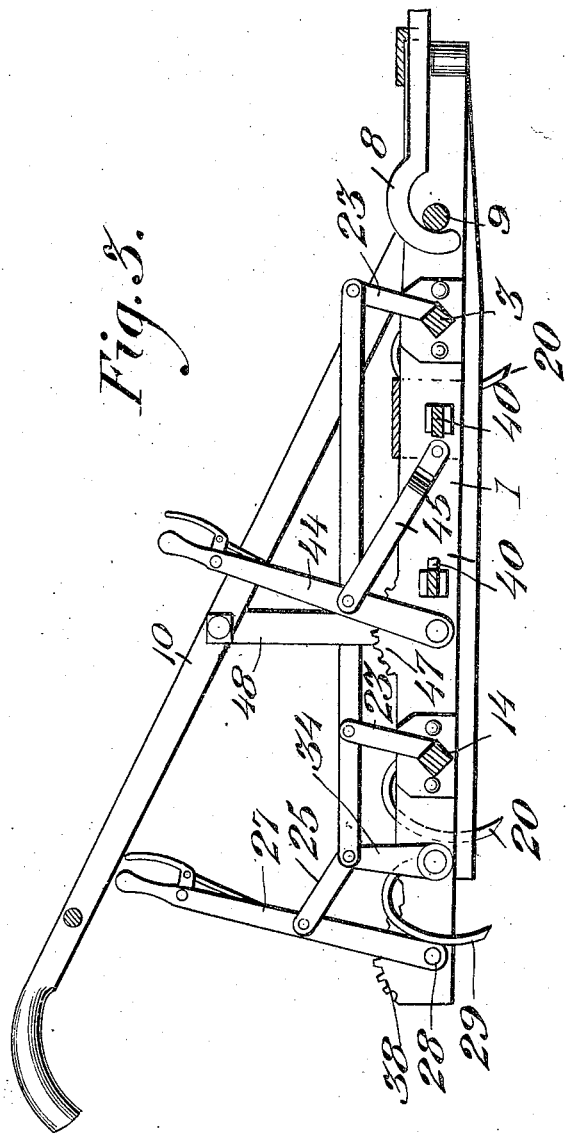
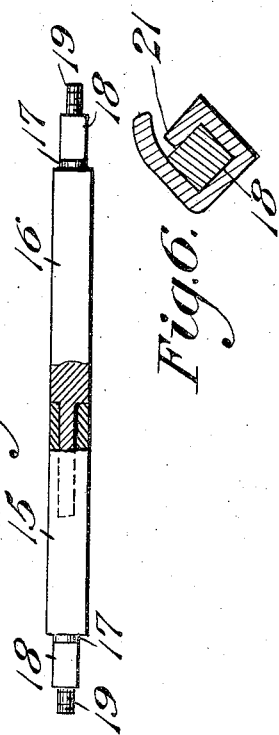
Witnesses
Phil. E. Barnes
C. C. Hines
Inventor
Arnold Nolf.
By Victor J. Evans
Attorney No. 847,101.

PATENTED MAR. 12, 1907.

A. NOLF.
CULTIVATOR.
APPLICATION FILED JUNE 16, 1906.

3 SHEETS—SHEET 3.

Witnesses
Frank B. Hoffman
C. C. Hines

Inventor
Arnold Nolf

By Victor J. Evans
Attorney

UNITED STATES PATENT OFFICE.

ARNOLD NOLF, OF COPEMISH, MICHIGAN.

CULTIVATOR.

No. 847,101. Specification of Letters Patent. Patented March 12, 1907.

Application filed June 16, 1906. Serial No. 322,046.

*To all whom it may concern:*

Be it known that I, ARNOLD NOLF, a citizen of the United States of America, residing at Copemish, in the county of Manistee and State of Michigan, have invented new and useful Improvements in Cultivators, of which the following is a specification.

This invention relates to improvements in harrows or cultivators, the object of the invention being to provide an implement of this character having simple and effective means for throwing the teeth into and out of operation and adjusting the same to work at different depths in the soil and means for adjusting the frame of the implement to vary the width thereof and adapt the sets of teeth at opposite sides of the frame to work at different distances apart.

With the above and other objects in view the invention consists of the novel features of construction, combination, and arrangement of parts hereinafter fully described and claimed, reference being had to the accompanying drawings, in which—

Figure 1 is a top plan view of a cultivator embodying my invention. Fig. 2 is a side elevation thereof. Fig. 3 is a central longitudinal section through the cultivator. Fig. 4 is a detail view, partly in section, of one of the rock-shafts. Fig. 5 is a detail section on line 5 5 of Fig. 1, showing the mode of mounting the rear central cultivator-tooth. Fig. 6 is a detail cross-section showing the mode of mounting the teeth upon the rock-shafts. Fig. 7 is a transverse section through the cultivator on the line 7 7 of Fig. 1.

The frame of the implement comprises a main beam 1 and oppositely-arranged side beams 2, connected in the manner hereinafter described. The beam 1 projects at its forward end between coupling-clips 3, united by bolts 4, to which the forward ends of the side beams are pivoted to permit said beams to be adjusted laterally with relation to the main beam. The main beam is provided at its front end with a draft-hook 5, and adjacent thereto is arranged a draft-bar 6, composed of parallel plates or members united at their forward ends by a cross-bolt 7. The plates extend rearwardly through the spaces between the clips 3 on opposite sides of the main beam 1 and are provided at their rear ends with hooked portions 8, engaged by a bolt 9, which clamps the same to the main beam and also serves as a fastening for the forward ends of the stilts or handles 10, which latter extend rearwardly and are further connected with the main beam 1 by braces 11, fastened at their upper ends to the handles by bolts 10' and at their lower ends to the main beam by a bolt 11'.

The beams 2 are provided with intermediate outwardly-bent portions or offsets 12, which dispose their outer or rear ends at a greater distance from the main beam than their front ends. Journaled upon the respective front and rear ends of the beams 2 are transverse rock-shafts 13 and 14, each of said shafts comprising a pair of telescopically or slidably connected members 15 and 16, as shown in Fig. 4. The ends of the shafts are formed with journals 17 to turn within bearing-openings in the beams and beyond said journals are formed with rectangular portions 18 and cylindrical threaded terminals 19. Fitted upon the portions 18 of the shafts are cultivator-teeth 20, each tooth being formed with a rectangular head or socket 21 to engage the portion 18, whereby the tooth is held from independent rotation on the shaft and fixed to turn therewith. The teeth are disposed on the outer sides of the beams 2 and are secured in position upon the shaft by nuts 22 engaging the portions 19. It will be observed that the described construction and method of mounting the parts disposes the teeth on each side of the frame in different planes, the rear teeth being arranged a greater distance apart than the front teeth.

The shafts are provided with cranks 23, connected by links 24, which adapt the shafts to turn in unison. At their rear ends the links 24 are pivoted to the arms of a yoke 25, which is connected by a link 26 with an adjusting-lever 27. This lever is pivotally mounted upon the rear end of the beam 1, as indicated at 28, and is adapted to be swung longitudinally of the frame in one direction or the other to rock the shafts, whereby the teeth 20 may be thrown downward to adjust them to penetrate the soil to a greater or less extent and thrown upward above the plane of the lower edges of the beams 2 out of operative position, in order that the implement may be conveniently transported from place to place. A rear central tooth 29 is mounted upon a bolt 30, carried by the beam immediately in advance of the lever 27, said bolt being formed with a journal 31 to turn in a bearing-opening in the beam and a rectangular shank 32. The tooth 29 is provided with a rectangular head or socket 33, similar to the heads 21 of teeth 20 and which engage said shank 32, whereby it is fixed to turn with the bolt. A link 34 connects the bolt and yoke and adapts the bolt 30 to be turned simultaneously with the rock-shaft to swing the tooth 29 with the teeth 20. The link is connected at its lower end with the rectangular portion of the bolt and is held connected therewith by a washer 35 and nut 36. The lever 27 carries a spring-actuated pawl 37, adapted to engage rack-teeth 38 on the main beam to lock said lever in adjusted position.

On the beam 2 are formed ears 39, to which the near ends of divergently-arranged shifting-levers 40 are pivoted by bolts 41, the forward ends of said levers being pivotally connected with a head or sleeve 42, slidably mounted on the shaft 1. The levers 40 are intermediately fulcrumed by links 43 to the beam 1 and are adjustable by the sliding motion of the sleeve 42 to move the beams 2 in and out or laterally with relation to the beam 1 on the pivots 4 to space the cultivator-teeth carried by said beams 2 a greater or less distance apart. An operating-lever 44 is pivotally mounted at its lower end upon the bolt 11' on the beam 1 and is connected with the sliding sleeve 42 by a link 45, whereby said sleeve may be adjusted to serve the function described. The said lever 44 is provided with a spring-actuated pawl 46 to engage a rack 47 on the beam 1, by which the lever is adapted to be locked in adjusted position. Curved braces 48 are connected at their upper ends by the bolts 10' to the handles 10 and are attached at their lower ends to the pivot-bolts 41. These braces serve to stay the handles and side beams and to add stability to the structure. They are made of straps of spring metal, so that they will readily yield to permit of the lateral adjustment of the side beams and also by their retractile energy assist the lever mechanism to return said beams to normal position.

The mode of use of the implement will be apparent from the foregoing description to those versed in the art, and the advantages of the structure in permitting of the adjustment of the teeth in the manners set forth will be appreciated.

It will of course be understood that the sections of the rock-shafts allow the shafts to lengthen or shorten upon the manipulation of the lever 44 to permit the beams 2 to be adjusted laterally toward and from the beam 1.

Having thus described the invention, what is claimed as new is—

1. A cultivator comprising a frame having laterally-adjustable side beams, rock-shafts carried by the beams, each of said shafts comprising a pair of sections journaled at their outer ends in the beams and slidably connected at their inner ends, cultivator-teeth carried by the rock-shaft sections, and means for coupling the rock-shaft sections and rocking said shafts in unison.

2. A cultivator comprising a frame having laterally-adjustable side beams, rock-shafts carried by said beams, each of said shafts comprising a pair of sections journaled at their outer ends in the beams and slidably connected at their inner ends, links having a cranked engagement with the rock-shaft sections, a lever connected with said links for simultaneously rocking the rock-shaft sections, cultivator-teeth mounted upon the rock-shaft sections, and means for adjusting the side beams.

3. A cultivator comprising a main beam, side beams pivotally connected with the main beam for lateral adjustment, rock-shafts carried by the side beams, each of said shafts comprising a pair of sections journaled at their outer ends in the side beams and slidably connected at their inner ends, cranks upon the rock-shaft sections, cultivator-teeth upon said sections, links connecting the cranks of the respective rock-shaft sections, a yoke coupling the links, and an operating-lever connected with the yoke for adjusting said rock-shaft sections.

4. A cultivator comprising a main beam, side beams pivoted to the main beam for lateral adjustment, rock-shafts carried by the side beams, each of said shafts comprising a pair of sections journaled at their outer ends on the main beam and slidably connected at their inner ends, cultivator-teeth upon the journaled ends of the shaft-sections, a rear central tooth pivotally mounted on the main beam, cranks upon the shaft-sections, links connecting said cranks, a yoke coupling the cranks, an adjusting-lever pivotally connected with the main beam and yoke for rocking the crank-shaft sections in unison, and an operative connection between said lever and said rear central cultivator-tooth for adjusting the latter simultaneously with the shafts.

5. A cultivator comprising a main beam, side beams pivotally connected at their forward ends with the main beam for lateral adjustment, front and rear rock-shafts carried by the side beams, each of said shafts comprising a pair of sections journaled at their outer ends on the side beams and slidably connected at their inner ends, cultivator-teeth on the journaled ends of the shaft-sections, cranks upon said shaft-sections, links connecting the sections of the front and rear shafts on opposite sides of the main beam, a yoke connecting the rear ends of the links to couple the shaft-sections for simultaneous adjustment, and a lever upon the rear end of the main beam connected with said yoke.

6. A cultivator comprising a frame including a main beam, side beams pivotally connected at their forward ends with the main beam, cultivator-teeth supported by the side beams, a sliding sleeve on the main beam, divergent levers pivotally connecting said sleeve with the side beams, correspondingly-arranged links connecting the levers with the main beam, a lever operatively connected with the sliding sleeve, whereby the side beams may be adjusted, and resilient braces connecting the side beams with the frame, said braces being adapted to permit outward movement of the side beams and by their retractile energy to assist in restoring said beams to normal position.

7. A cultivator comprising a central main beam, side beams pivotally connected for lateral adjustment at their forward ends to the main beam, front and rear rock-shafts carried by said side beams, each of said shafts comprising a pair of sections journaled at their outer ends on the side beams and slidably connected at their inner ends, cultivator-teeth on the journaled ends of the shaft-sections, cranks upon said shaft-sections, an operating-lever, connections between said lever and the respective crank-shaft sections for rocking the latter in unison, said crank-shaft sections being slidably connected as described to permit lateral adjustment of the side beams, and adjusting mechanism on the frame and connected with said side beams for adjusting the same in and out.

In testimony whereof I affix my signature in presence of two witnesses.

ARNOLD NOLF.

Witnesses:
ALVAH CRUMNUS,
W. J. RACHOW.